US010059430B2

(12) United States Patent
Lucas et al.

(10) Patent No.: US 10,059,430 B2
(45) Date of Patent: Aug. 28, 2018

(54) AIRCRAFT AIR SCOOP SYSTEMS WITH PASSIVE PNEUMATIC ACTUATORS

(71) Applicant: Gulfstream Aerospace Corporation, Savannah, GA (US)

(72) Inventors: Mike Lucas, Savannah, GA (US); George Clay Nolen, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 93 days.

(21) Appl. No.: 14/314,170

(22) Filed: Jun. 25, 2014

(65) Prior Publication Data

US 2015/0375848 A1    Dec. 31, 2015

(51) Int. Cl.
*B64D 13/00* (2006.01)
*B64C 7/00* (2006.01)
(Continued)

(52) U.S. Cl.
CPC .............. *B64C 7/00* (2013.01); *B64D 13/00* (2013.01); *B64D 13/02* (2013.01); *B64D 37/32* (2013.01);
(Continued)

(58) Field of Classification Search
CPC ..... B64C 7/00; B64C 1/0009; B64C 2220/00; B64C 21/00; B64D 13/02; B64D 13/04;
(Continued)

(56) References Cited

U.S. PATENT DOCUMENTS 2,391,197 A * 12/1945 Schwien ................ B64D 13/04
                                                137/488
2,407,540 A *  9/1946 Del Mar ................ B64D 13/02
                                                137/486
(Continued)

FOREIGN PATENT DOCUMENTS

EP            1327581 A2    7/2003

OTHER PUBLICATIONS

European Patent Office, Extended European Search Report in European Patent Application No. EP 15169434.6 dated Oct. 30, 2015.

*Primary Examiner* — Medhat Badawi
*Assistant Examiner* — Vicente Rodriguez
(74) *Attorney, Agent, or Firm* — LKGlobal|Lorenz & Kopf, LLP

(57) ABSTRACT

Aircraft and air scoop systems are provided. An aircraft includes an interior compartment, an outer skin, an air scoop, it movable element, and a passive pneumatic actuator. The interior compartment encloses a substantially constant interior air mass at a cabin pressure during flight and the outer skin at least partially defines a ventilated cavity. The air scoop is disposed on the outer skin and communicates air between the ventilated cavity and an external environment in which the aircraft is located. The movable element is movable between an open position and a closed position over the air scoop to define an air flow area through the air scoop. The passive pneumatic actuator is operatively coupled with the movable element and moves the movable element towards the closed position in response to an increasing altitude of the aircraft based on a differential pressure between the interior air mass and the external environment.

18 Claims, 3 Drawing Sheets

(51) Int. Cl.
*B64D 13/02* (2006.01)
*B64D 37/32* (2006.01)
*B64D 13/06* (2006.01)

(52) U.S. Cl.
CPC ....... *B64D 2013/0618* (2013.01); *Y02T 50/56* (2013.01)

(58) Field of Classification Search
CPC ................... B64D 13/00; B64D 11/00; B64D 2013/0618; B60H 1/26; F03B 17/06
USPC .......................................................... 244/1 N
See application file for complete search history.

(56) References Cited

U.S. PATENT DOCUMENTS

| | | | | |
|---|---|---|---|---|
| 2,723,615 A * | 11/1955 | Morris | ................... | B64D 13/02 137/486 |
| 2,773,440 A * | 12/1956 | Arthur | ................... | B64D 13/02 137/81.1 |
| 2,884,905 A * | 5/1959 | Jensen | ................... | F15B 9/08 137/82 |
| 3,752,422 A | 8/1973 | Runnels et al. | | |
| RE32,554 E * | 12/1987 | Murphy | ................... | B64C 1/18 244/118.5 |
| 5,894,987 A | 4/1999 | Layne et al. | | |
| 7,222,819 B1 * | 5/2007 | Kelnhofer | ................... | B64D 13/00 244/53 B |
| 7,618,006 B2 | 11/2009 | Parikh et al. | | |
| 7,832,684 B2 | 11/2010 | Scherer et al. | | |
| 8,141,816 B2 | 3/2012 | Robbins et al. | | |
| 8,240,331 B2 * | 8/2012 | Appleby | ................... | B64D 13/00 137/526 |
| 8,262,018 B2 | 9/2012 | Scherer et al. | | |
| 8,360,358 B2 | 1/2013 | Klimpel | | |
| 8,403,264 B2 | 3/2013 | Schiek et al. | | |
| 2009/0159748 A1 | 6/2009 | Treimer et al. | | |
| 2010/0087132 A1 | 4/2010 | Alvarez et al. | | |
| 2011/0073716 A1 | 3/2011 | Klimpel | | |
| 2011/0136425 A1 * | 6/2011 | Eichholz | ................... | B64C 7/00 454/76 |
| 2011/0183595 A1 | 7/2011 | Liebich | | |

* cited by examiner

AIRCRAFT AIR SCOOP SYSTEMS WITH PASSIVE PNEUMATIC ACTUATORS

TECHNICAL FIELD

The technical field relates generally to air scoop systems for aircraft, and more particularly relates to air scoop systems with passive pneumatic actuators for passively modulating openings.

BACKGROUND

A conventional passenger aircraft includes one or more ventilated cavities that are not pressurized during flight. One typical ventilated cavity resides within the wing-to-body fairing that forms a blended aerodynamic surface between the fuselage and wing. These wing-to-body fairings are typically ventilated with air scoops or air inlets to remove air that could possibly contain fuel vapors. Another typical ventilated cavity is an enclosure for a heat exchanger of environmental control systems on the aircraft.

As the speed of the aircraft increases, the air flow through these ventilated cavities increases with a fixed area air scoop. This increased air flow causes excess noise in the cabin of the aircraft and can increase the aerodynamic drag on the aircraft. One solution for decreasing this excess noise and drag is to modulate the area of the air scoop. Such modulation is typically accomplished with use of electronic actuators and sensors to actively manage the area of the air scoop. These actively managed air scoops have the disadvantage of requiring additional electronic components and adding complexity to the aircraft.

As such, it is desirable to provide air scoop systems with modulating areas that have reduced management complexity. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft and air scoop systems for aircraft are disclosed herein.

In a first non-limiting embodiment, an aircraft includes, but is not limited to, an interior compartment, an outer skin, an air scoop, a movable element, and a passive pneumatic actuator. The interior compartment encloses a substantially constant interior air mass at a cabin pressure during flight and the outer skin at least partially defines a ventilated cavity. The air scoop is disposed on the outer skin and communicates air between the ventilated cavity and an external environment in which the aircraft is located. The movable element is movable between an open position and a closed position over the stir scoop to define all air flow area through the air scoop. The passive pneumatic actuator s operatively coupled with the movable element and moves the movable element towards the closed position in response to an increasing altitude of the aircraft based on a differential pressure between the interior air mass and the external environment.

In a second non-limiting embodiment, an air scoop system includes, but is not limited to, an air scoop, a movable element, and a passive pneumatic actuator. The air scoop is configured to be disposed on an outer skin of the aircraft and is configured to communicate air between a ventilated cavity and an external environment in which the aircraft is located. The movable element is movable between an open position and a closed position over the air scoop to define an air flow area through the air scoop. The passive pneumatic actuator is operatively coupled with the movable element and is configured to move the movable element towards the closed position in response to an increasing altitude of the aircraft based on a differential pressure between the external environment and a substantially constant interior air mass enclosed by an interior compartment of the aircraft at a cabin pressure during flight of the aircraft.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of aircraft and air scoop systems are disclosed herein. A greater understanding of the aircraft and air scoop systems may be obtained through a review of the illustrations accompanying this application together with a review of the detailed description that follows.

Figure 1:
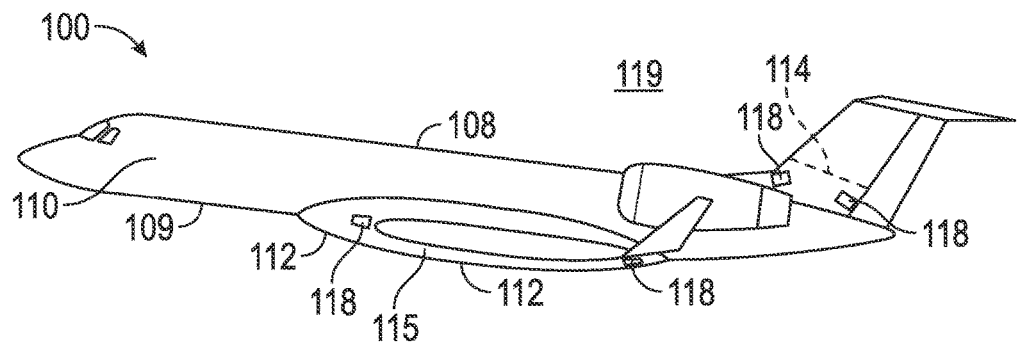
FIG. 1 is a side view illustrating a non-limiting embodiment of an aircraft in accordance with the teachings of the present disclosure.

FIG. 1 is a side view illustrating a non-limiting embodiment of an aircraft 100 in accordance with the teachings of the present disclosure. Aircraft 100 includes an outer skin 108, an interior compartment 110, a wing-to-body fairing 112, a fairing cavity 115, an environmental control system (ECS) compartment 114, and air scoop systems 118. Outer skin 108 defines an outer periphery of aircraft 100 that is wetted by external airflow as the aircraft flies through the air, including portions of the fuselage skin 109, wing, tail and engine and their associated aerodynamic fairings. This embodiment includes portions of the fuselage skin, the wing-to-body fairing 112, and the ECS compartment 114. The wing-to-body fairing 112 is a subset of the outer skin 108.

Interior compartment 110 is a pressure vessel that includes the cabin and cockpit of aircraft 100. Various pressurization components (not illustrated) maintain interior compartment 110 at a cabin pressure when aircraft 100 is in flight, as will be appreciated by those with skill in the art. An interior air mass enclosed by interior compartment 110 typically remains at a higher pressure than the external environment 119 to maintain passenger comfort.

Fairing cavity 115 and ECS compartment 114 are ventilated cavities that are not pressurized during flight of aircraft 100 and have internal pressures similar in magnitude to the external environment 119. Wing-to-body fairing 112 is ventilated according to Federal Aviation Administration requirements based on removing potential fuel vapor from fairing cavity 115. ECS compartment 114 is ventilated to provide cool air to a heat exchanger component of air conditioning portions of the ECS.

Air scoop systems 118 are disposed on outer skin 108 and are configured to communicate air between ventilated cavities (e.g., fairing cavity 115 and ECS compartment 114) and an external environment 119 in which aircraft 100 is located. Air scoop systems 118 may include air inlets or air outlets without departing from the scope of the present disclosure. In some embodiments, air scoop systems 118 include air inlets and the ventilated cavities include conventional air outlets.

Figure 2A:
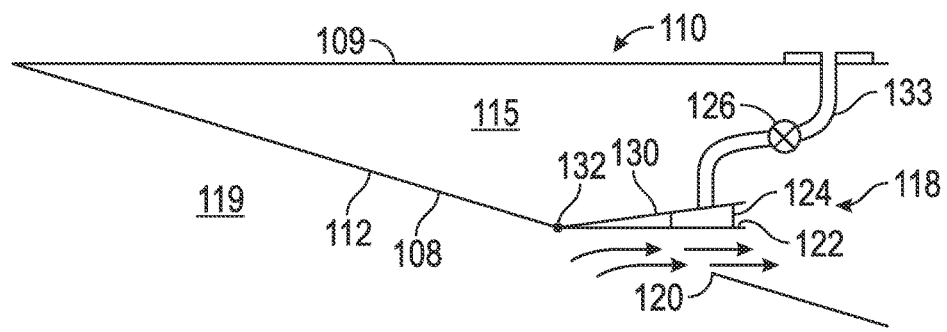
FIGS. 2A and 2B are cross-sectional views illustrating a non-limiting embodiment of the air scoop system of FIG. 1 in accordance with the teachings of the present disclosure.
Figure 2B:
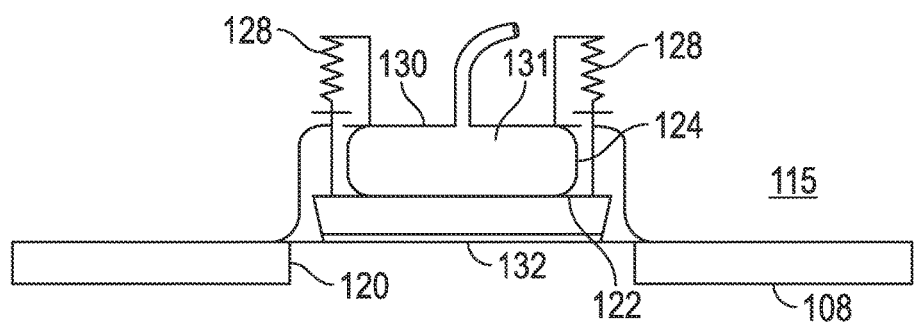

With further reference to FIGS. 2A and 2B, cross-sectional views illustrate a non-limiting embodiment of air scoop system 118 in accordance with the teachings of the present disclosure. Each air scoop system 118 includes an air scoop 120, a movable element 122, a passive pneumatic actuator 124, a pressure actuated valve 126, an air pressure supply line 133, and two resilient members 128. Air scoop system 118 is movable between an open position and a closed position based on the altitude of aircraft 100, as will be described below. In the open position, an air flow area through which air can flow through air scoop system 118 and the ventilated cavity is maximized. The maximized air flow area is preselected to provide an air flow based on a low speed operation of aircraft 100, such as during takeoff/landing and flight below 10,000 feet. In the closed position, the air flow area through which air can flow through air scoop system 118 and the ventilated cavity is minimized. The minimized air flow area is typically preselected to provide an air flow based on a high speed operation of aircraft 100, such as when aircraft 100 is at cruising speed.

Air scoop 120 is an aperture or opening in outer skin 108. In the example provided, air scoop 120 includes a fixed member 130 extending into the ventilated cavity from outer skin 108. Fixed member 130 provides a counter-acting force to passive pneumatic actuator 124 and resilient members 128, as will be described below. Air scoop 120 may have various shapes to reduce wind noise within or drag on aircraft 100, as will be appreciated by those with skill in the art.

Movable element 122 is movable between an open position and a closed position over air scoop 120 to define an air flow area through air scoop 120. The open and closed positions of movable element 122 define the open and closed positions of air scoop system 118, as will be appreciated by those with skill in the art. By varying the air flow area, the air flow through the ventilated cavity may be modulated to reduce air flow at higher altitudes where aircraft 100 is typically at a cruising speed. In the example provided, movable element 122 is an articulating ramp that is secured to air scoop 120 or outer skin 108 with a hinge 132.

Passive pneumatic actuator 124 is operatively coupled with movable element 122. Passive pneumatic actuator 124 is further configured to move movable element 122 towards the closed position and in response to an increasing altitude of aircraft 100 based on a differential pressure between the interior air mass in interior compartment 110 and external environment 119. As will be appreciated by those with skill in the art, as altitude of aircraft 100 increases, atmospheric pressure in external environment 119 decreases. The forces provided by passive pneumatic actuator 124 and resilient member 128 may vary and be optimized for particular applications without departing from the scope of the present disclosure.

In the example provided, passive pneumatic actuator 124 is an air bladder that rotates movable element 122 about hinge 132. In some embodiments, passive pneumatic actuator 124 is a bellows system, a pneumatic piston, or any other device that may be used to passively actuate movable element 122 based on the differential pressure. Passive pneumatic actuator 124 is configured to put movable element 122 in the closed position when aircraft 100 is at a cruise altitude. As will be appreciated by those with skill in the art, aircraft 100 is generally traveling at a cruising speed when at cruise altitude. At cruising speed, the air flow area of air scoop system 118 when movable element 122 is in the closed position is sufficient to ventilate the ventilated cavity.

The interior air mass of interior compartment 110 is much larger than the volume of air used to actuate passive pneumatic actuator 124. Accordingly, the air pressure of the interior air mass in interior compartment 110 may be considered to be substantially constant throughout the movable range of passive pneumatic actuator 124 and movable element 122.

Pressure actuated valve 126 is operatively coupled between the interior air mass of interior compartment 110 and passive pneumatic actuator 124. Pressure actuated valve 126 restricts air flow from interior compartment 110 to passive pneumatic actuator 124 when the differential pressure between interior compartment 110 and external environment 119 is below a threshold value. By way of example, pressure actuated valve 126 may be selected to open at a specific p.s.i.d. and keep air scoop system 118 in the open position at low altitudes and speeds. Passive pneumatic actuator 124 may also contain a small exit port 131 to allow pressurized air to slowly escape so that pressurized air is not trapped in the passive pneumatic actuator 124 when pressure actuated valve 126 is closed. In some embodiments, pressure actuated valve 126 is omitted, and the interior air mass is in direct fluid communication with movable element 130.

In the example provided, resilient members 128 are coil springs in tension between fixed member 130 and movable element 122. In other embodiments, other type of resilient members may be utilized. Tension within resilient members 128 pulls movable element 122 toward fixed member 130 and away from outer skin 108 to urge air scoop system 118 into the open position. Passive pneumatic actuator 124, resilient members 128, and pressure actuated valve 126 cooperate to position movable element 122 in the open position when the aircraft is below a threshold altitude to maximize the air flow area. As will be appreciated by those with skill in the art, at low altitudes aircraft 100 is generally traveling at low air speeds and a maximized air flow area is desirable to provide sufficient ventilation of fairing cavity 115 or ECS compartment 114. It should be appreciated that any number of resilient members 128 may be utilized in any given implementation without departing from the scope of the present disclosure.

Figure 3:
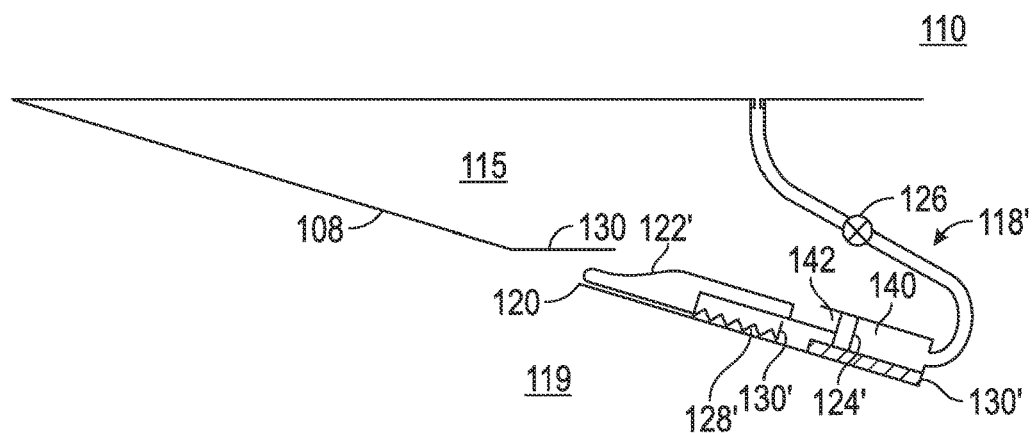
FIG. 3 is a cross-sectional view illustrating a non-limiting embodiment of the air scoop system of FIG. 1 in accordance with the teachings of the present disclosure.

With further reference to FIG. 3, a cross-sectional view illustrates a non-limiting embodiment of an air scoop system 118' in accordance with the teachings of the present disclosure. Air scoop system 118' is similar to air scoop system 118, where like numbers refer to like components. Air scoop system 118', however, includes movable element 122', passive pneumatic actuator 124', resilient member 128', and additional fixed members 130'.

Movable element 122' is a guillotine member that translates across air scoop 120 to vary an air flow area of air scoop system 118'. It should be appreciated that movable element 122' may translate in any direction across air scoop 120 without departing from the scope of the present disclosure. Movable element 122' is in sliding engagement with an inner surface of outer skin 108. Passive pneumatic actuator 124' may be any suitable system, such as a pneumatic piston and cylinder system, a bellows, or a bladder. A first side 140 of pneumatic actuator 124' is in pneumatic communication with interior compartment 110 through pressure actuated valve 126 and air pressure supply line 133. A second side 142 of pneumatic actuator 124' is in pneumatic communication with external environment 119. The pressure differential between interior compartment 110 and external environment 119 provides a net force across the piston of pneumatic actuator 124' to translate movable element 122'.

Fixed members 130' are similar to fixed member 130. Fixed members 130', however, are secured to outer skin 108 or other structural components of aircraft 100 and are separated from air scoop 120. In the example provided, fixed members 130' are disposed downstream of air scoop 120 with respect to air flow through fairing cavity 115 or ECS compartment 114. Resilient member 128' is similar to resilient member 128, but is disposed between fixed member 130' and movable element 122'.

Figure 4:
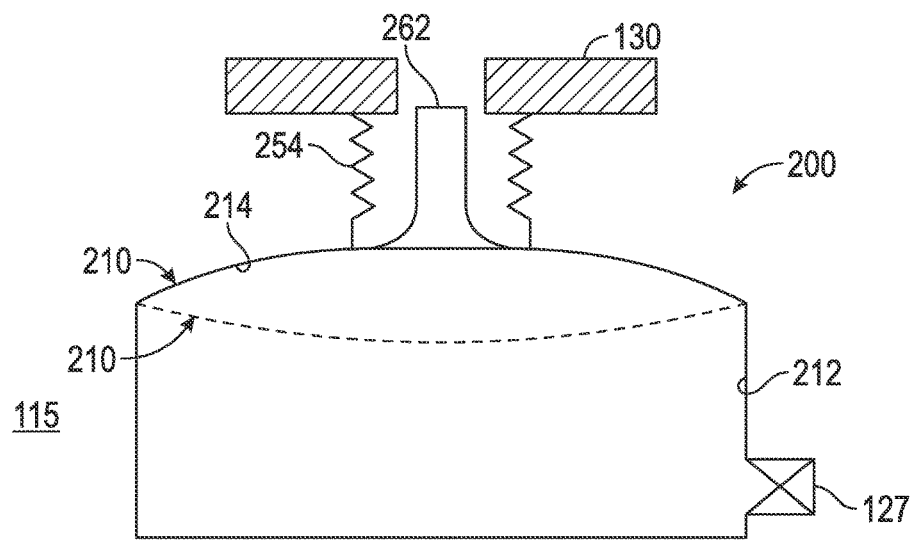
FIGS. 4 and 5 are cross-sectional views illustrating non-limiting embodiments of passive pneumatic actuators of the air scoop system of FIG. 1 in accordance with the teachings of the present disclosure.

Referring now to FIG. 4, a cross-sectional view illustrates a non-limiting embodiment of a passive pneumatic actuator 200 in accordance with teachings of the present disclosure. Passive pneumatic actuator 200 may be utilized in air scoop system 118 or 118' in place of or in addition to passive pneumatic actuator 124 and/or 124'. Passive pneumatic actuator 200 is a cylindrical "oil can" design with a diaphragm 210 separating an enclosed cavity 212 from the fairing cavity 115. Actuation rod 262 is in communication with movable element 122. As the differential pressure between the enclosed cavity 212 and fairing cavity 115 varies, diaphragm 210 flexes and adjusts a force applied to movable element 122 through actuation rod 262 to vary the air flow area, as will be appreciated by those with skill in the art. Resilient member 254 is compressed between the outer surface of the diaphragm 210 and fixed member 130 to bias actuation rod 262 and urge movable element 122 towards the open position. Check valve 127 allows re-pressurization of enclosed cavity 212 when pressure in fairing cavity 115 is higher than the pressure in enclosed cavity 212.

Figure 5:
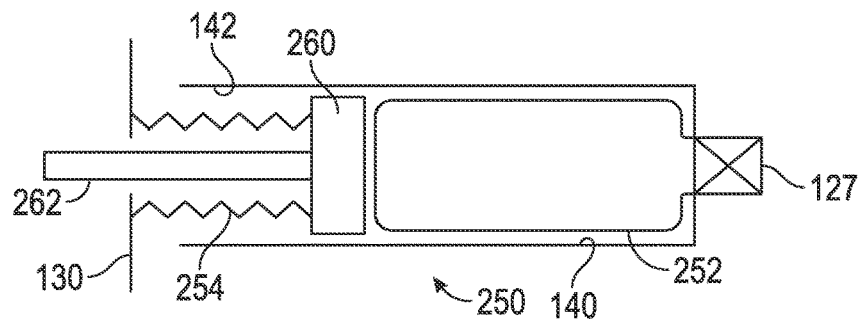

Referring now to FIG. 5, a cross-sectional view illustrates a non-limiting embodiment of a passive pneumatic actuator 250 in accordance with teachings of the present disclosure. Passive pneumatic actuator 250 may be utilized in air scoop system 118 or 118' in place of or in addition to passive pneumatic actuator 124 and/or 124'. Passive pneumatic actuator 250 is a pneumatic piston design that is similar to passive pneumatic actuator 124', where like numbers refer to like components. Passive pneumatic actuator 250, however, includes a bladder 252 and a resilient member 254.

Bladder 252 is in pneumatic communication with pressure actuated check valve 127 and is disposed iii first cavity 140 to a first side of a piston 260. An actuation rod 262 extends from a second side of piston 260 and couples with movable element 122 or 122'. As the differential pressure between interior compartment 110 and external environment 119 varies, bladder 252 expands and adjusts a force applied to movable element 122 to vary the air flow area, as will be appreciated by those with skill in the art. Resilient member 254 is compressed between the second side of piston 260 and fixed member 130 to bias piston 260 and urge movable element 122 towards the open position.

Figure 6A:
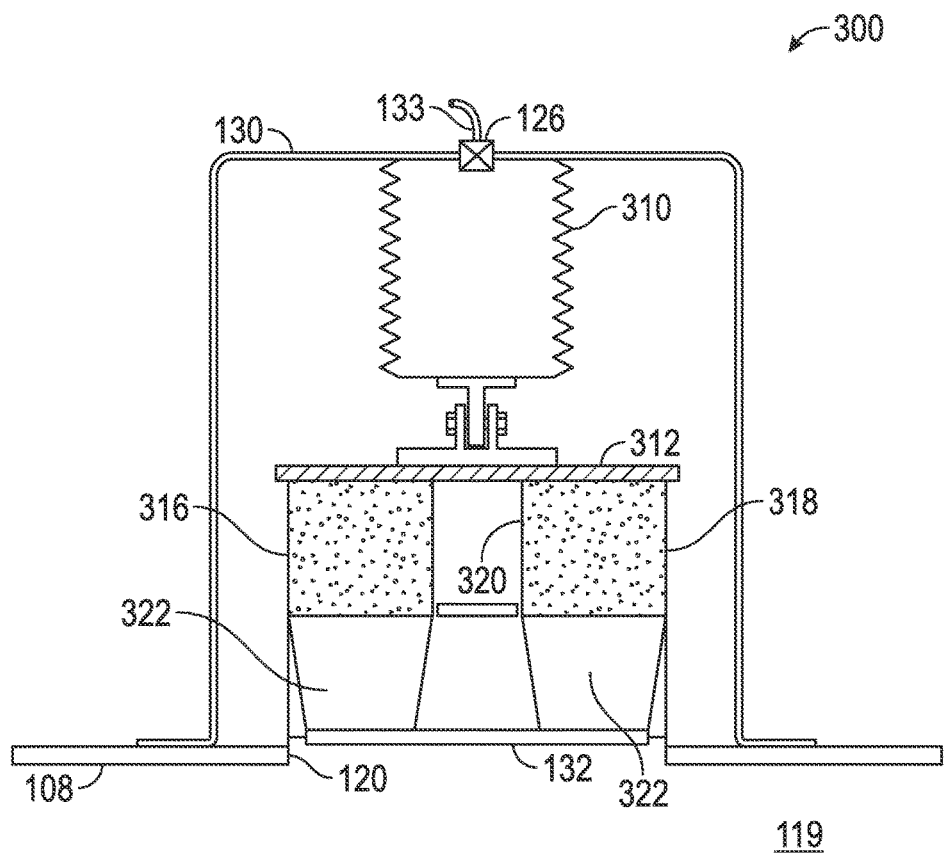
FIGS. 6A and 6B are cross-sectional views illustrating a non-limiting embodiment of the air scoop system of FIG. 1 in accordance with the teachings of the present disclosure.
Figure 6B:
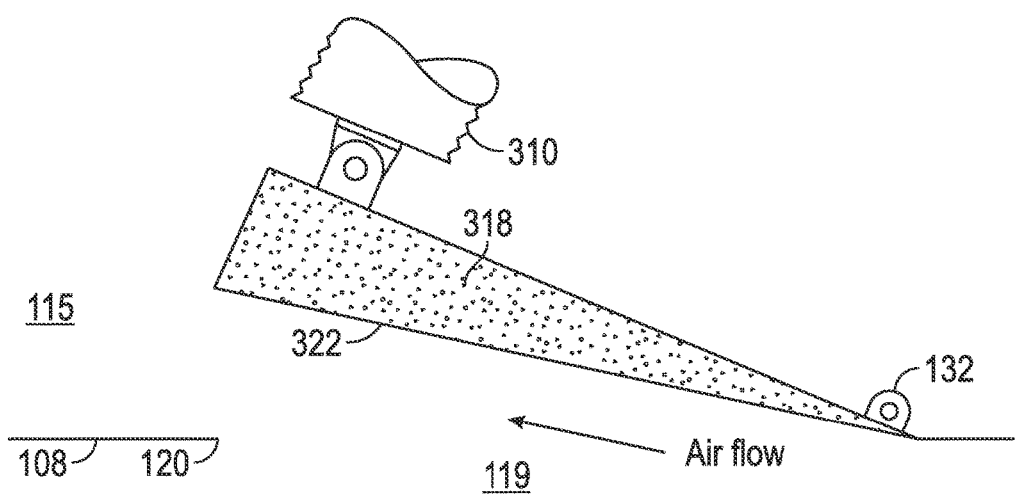

Referring now to FIGS. 6A and 6B, cross-sectional views illustrate a non-limiting embodiment of an air scoop system 300 in accordance with the teachings of the present disclosure. Air scoop system 300 is similar to air scoop system 118 and air scoop system 118', where like numbers refer to like components. Air scoop system 300, however, includes passive pneumatic actuator 310 and movable element 312.

Passive pneumatic actuator 310 is an air bellows device that expands or contracts based on a differential pressure between an interior and an exterior of the bellows device. The interior of the air bellows device is in pneumatic communication with interior compartment 110 through pressure actuated valve 126 and pressure supply line 133. The exterior of the air bellows device is exposed to fairing cavity 115. In some embodiments, passive pneumatic actuator 310 is a bellows device with a sealed volume of air, or a near vacuum volume of air, that omits pressure actuated valve 126. The delta pressure between the internal volume of the bellows and the external environment 119 in such embodiments causes the bellows to contract and urges movable element 312 towards the open position at low altitudes of aircraft 100.

Movable element 312 is an articulating ramp similar to movable element 122. Movable element 312, however, includes a first portion 316 and a second portion 318 that define a groove 320. First and second portions 316 and 318 include outer surfaces 322 that are substantially co-planar with outer skin 108 when air scoop system 300 is in the closed position. Groove 320 between first portion 316 and second portion 318 defines a minimum air flow area for permitting air flow through the ventilated cavity when air scoop system 300 is in the closed position.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft, comprising:
   an interior compartment configured to enclose a substantially constant interior air mass at a cabin pressure during flight of the aircraft;
   an outer skin that at least partially defines a ventilated cavity;
   an air scoop disposed on the outer skin and configured to communicate air between the ventilated cavity and an external environment in which the aircraft is located;
   a movable element movable between an open position and a closed position over the air scoop to define an air flow area through the air scoop;
   a passive pneumatic actuator comprising a first side in pneumatic communication with the interior compartment and a second side in pneumatic communication with the external environment, wherein the passive pneumatic actuator is operatively coupled with the movable element and is configured to move the movable element towards the closed position in response to an increasing altitude of the aircraft based on a differential pressure between the interior air mass and the external environment; and a pressure actuated valve coupled between the interior air mass and the passive pneumatic actuator, wherein the pressure actuated valve is configured to restrict air flow from the interior compartment to the passive pneumatic actuator when the differential pressure is below a threshold value.

2. The aircraft of claim 1, wherein the interior compartment at least partially defines a cabin and a cockpit of the aircraft.

3. The aircraft of claim 1, further comprising a resilient member biasing the movable element towards the open position.

4. The aircraft of claim 3, wherein the passive pneumatic actuator and the resilient member cooperate to position the movable element in the open position when the aircraft is below a threshold altitude to maximize the air flow area.

5. The aircraft of claim 1, wherein the passive pneumatic actuator is configured to position the movable element in the closed position when the aircraft is at a cruise altitude to minimize the air flow area.

6. The aircraft of claim 1, wherein the ventilated cavity is a wing-to-body fairing.

7. The aircraft of claim 1, wherein the ventilated cavity encloses components of an environmental control system.

8. The aircraft of claim 1, wherein the movable element is an articulating ramp that is secured to the air scoop with a hinge, and wherein the passive pneumatic actuator is configured to rotate the articulating ramp about the hinge.

9. The aircraft of claim 1, wherein the movable element is a guillotine member, and wherein the passive pneumatic actuator is configured to translate the guillotine member across the air scoop to vary the air flow area.

10. The aircraft of claim 1, wherein the passive pneumatic actuator is one of an air bladder and an air bellows.

11. The aircraft of claim 1, wherein the passive pneumatic actuator is a pneumatic piston.

12. An air scoop system for an aircraft, the air scoop system comprising:

an air scoop configured to be disposed on an outer skin of the aircraft and configured to communicate air between a ventilated cavity and an external environment in which the aircraft is located;

a movable element movable between an open position and a closed position over the air scoop to define an air flow area through the air scoop;

a passive pneumatic actuator comprising a first operable side and a second operable side, wherein the passive pneumatic actuator is operatively coupled with the movable element and configured to move the movable element towards the closed position in response to an increasing altitude of the aircraft based on a differential pressure between the external environment and a substantially constant interior air mass enclosed by an interior compartment of the aircraft at a cabin pressure during flight of the aircraft, and wherein the first operable side is in pneumatic communication with the interior compartment and the second operable side is in pneumatic communication with the external environment; and a pressure actuated valve coupled with the passive pneumatic actuator, wherein the pressure actuated valve is configured to restrict air flow from the interior compartment to the passive pneumatic actuator when the differential pressure is below a threshold value.

13. The air scoop system of claim 12, further comprising a resilient member biasing the movable element towards the open position.

14. The air scoop system of claim 13, wherein the passive pneumatic actuator and the resilient member cooperate to position the movable element in the open position when the aircraft is below a threshold altitude to maximize the air flow area.

15. The air scoop system of claim 12, wherein the passive pneumatic actuator is configured to position the movable element in the closed position when the aircraft is at a cruise altitude to minimize the air flow area.

16. The air scoop system of claim 12, wherein the air scoop system is configured to provide ventilation to one of a wing-to-body fairing and a cavity that encloses components of an environmental control system.

17. The air scoop system of claim 12, wherein the movable element is an articulating ramp that is secured to the air scoop with a hinge, and wherein the passive pneumatic actuator is configured to rotate the articulating ramp about the hinge.

18. The air scoop system of claim 12, wherein the movable element is a guillotine member, and wherein the passive pneumatic actuator is configured to translate the guillotine member across the air scoop to vary the air flow area.

* * * * *